United States Patent
Nakamura

(10) Patent No.: US 12,027,953 B2
(45) Date of Patent: Jul. 2, 2024

(54) SUPERCONDUCTING ROTATING MACHINE

(71) Applicant: KYOTO UNIVERSITY, Kyoto (JP)

(72) Inventor: Taketsune Nakamura, Kyoto (JP)

(73) Assignee: KYOTO UNIVERSITY, Kyoto (JP)

( * ) Notice: Subject to any disclaimer, the term of this patent is extended or adjusted under 35 U.S.C. 154(b) by 49 days.

(21) Appl. No.: 17/913,574

(22) PCT Filed: Mar. 24, 2021

(86) PCT No.: PCT/JP2021/012234
§ 371 (c)(1),
(2) Date: Sep. 22, 2022

(87) PCT Pub. No.: WO2021/193714
PCT Pub. Date: Sep. 30, 2021

(65) Prior Publication Data
US 2023/0135926 A1   May 4, 2023

(30) Foreign Application Priority Data
Mar. 26, 2020  (JP) ................................. 2020-056792

(51) Int. Cl.
*H02K 55/02* (2006.01)
*H02K 16/02* (2006.01)

(52) U.S. Cl.
CPC ............. *H02K 55/02* (2013.01); *H02K 16/02* (2013.01)

(58) Field of Classification Search
CPC ......... H02K 16/02; H02K 55/02; Y02E 40/60
See application file for complete search history.

(56) References Cited

U.S. PATENT DOCUMENTS 4,275,320 A * 6/1981 Baumann .............. F17C 13/001
310/52
6,590,312 B1   7/2003 Seguchi et al.
(Continued)

FOREIGN PATENT DOCUMENTS

JP   2011-103708    5/2011
JP   2014-217166 A  11/2014
(Continued)

OTHER PUBLICATIONS

JP-2014217166-A, Ito et al. all pages (Year: 2014).*
(Continued)

*Primary Examiner* — Naishadh N Desai
(74) *Attorney, Agent, or Firm* — GREENBLUM & BERNSTEIN, P.L.C.

(57) ABSTRACT

A superconducting rotating machine includes a stator that includes a cylindrical stator iron core and a stator winding that is toroidally wound around the stator iron core and formed of a superconducting material, and generates a rotating magnetic field, an inner rotor rotatably held at an inner circumferential side of the stator, and an outer rotor rotatably held at an outer circumferential side of the stator. The inner and outer rotors each include at least one rotor winding selected from a superconducting squirrel cage winding including a single or a plurality of rotor bars and end rings that are formed of a superconducting material, and a normal conducting squirrel cage winding including a single or a plurality of rotor bars and end rings that are formed of a normal conducting material, and a rotor iron core including a plurality of slots that accommodate respective rotor bars of the rotor winding.

8 Claims, 9 Drawing Sheets

(56) References Cited

U.S. PATENT DOCUMENTS

2011/0084566 A1* 4/2011 Nakamura ............. H02K 55/04
 505/166
2015/0015104 A1 1/2015 Kataoka et al.

FOREIGN PATENT DOCUMENTS

| JP | 2014217166 A | * 11/2014 |
| JP | 2015-194262 A | 11/2015 |
| WO | 2009/116219 A1 | 9/2009 |

OTHER PUBLICATIONS

International Search Report (including English Language Translation), mailed Jun. 1, 2021, by the Japan Patent Office, in International Application No. PCT/JP2021/012234.

* cited by examiner

SUPERCONDUCTING ROTATING MACHINE

TECHNICAL FIELD

The present invention relates to a superconducting rotating machine, and particularly relates to a rotating electric machine including a plurality of rotors.

BACKGROUND ART

Rotating machines that are electric devices are classified into DC machines and AC machines. Of them, the AC machines receive mechanical power and generate alternating-current power or receive alternating-current power and generate mechanical power, and are mainly classified into induction machines and synchronous machines.

An induction machine, for example, an induction motor rotates by causing a rotor to generate induction torque by a rotating magnetic field generated by applying an AC voltage to the stator winding. An induction motor is widely used because of a simple structure, easy maintenance, low cost and the like, but has problems in terms of efficiency and speed control.

A synchronous machine, for example, a synchronous motor rotates by a rotor including an electromagnet or a permanent magnet being attracted by a rotating magnetic field that is generated by applying an AC voltage to the stator winding. The synchronous motor is highly efficient, but needs additional equipment for start and synchronous pull-in.

In recent years, there has been proposed a superconducting rotating machine that has a configuration of an induction machine but is capable of synchronous rotation (see Patent Literature 1 described below). According to Patent Literature 1, for example, there is disclosed the superconducting rotating machine that is capable of slip rotation and synchronous rotation, has good elimination of heat and easily captures magnetic flux for synchronous rotation.

CITATION LIST

Patent Literature

Patent Literature 1: International Publication No. WO2009/116219

SUMMARY OF INVENTION

Technical Problem

As a rotating machine using a superconducting material, a rotating machine using a superconducting material for a stator is assumed, besides a rotating machine using a superconducting material for a rotor. The rotating machine using the superconducting material for the rotor is presumed to further improve energy conversion efficiency from electric power to torque.

In recent years, applications using rotating machines have expanded year by year, and development of rotating machines with high output (torque) is earnestly desired. For example, in order to exhibit high torque in a rotating machine using a superconducting material for a stator, increasing a critical current (a maximum current value that can formally maintain zero resistance in a superconducting state) in an iron core of the stator can be cited as one means. In order to enhance the critical current in the iron core of a stator, it is conceivable to use a stator of a toroidal structure (Hereinafter, a stator of a toroidal structure may be simply referred to as a "toroidal stator"), for example. In this regard, in a conventional induction motor using a normal conducting material, use of a toroidal stator has been considered as disadvantageous from a viewpoint of energy conversion efficiency, but in a motor using superconductivity in a stator, the effect of improving the critical current in the iron core works better than the disadvantage due to the energy conversion efficiency in many cases.

However, a toroidal stator structurally has large leakage magnetic flux not only to an inner side in a radial direction but also to an outer side thereof. It is known that since the leakage magnetic flux does not contribute to torque, the leakage magnetic flux becomes a cause of reduction of energy conversion efficiency from electric power to torque, and influences peripheral devices. Therefore, in order to inhibit the influence on the peripheral devices, it is necessary to install magnetic flux leakage prevention means such as a magnetic shield at the outer side of the toroidal stator to prevent the leakage magnetic flux.

In order to solve the problem described above, the present invention has an object to provide a superconducting rotating machine excellent in energy conversion efficiency.

Solution to Problem

The present invention provides a superconducting rotating machine including a stator that includes a cylindrical stator iron core and a stator winding that is toroidally wound around the stator iron core and formed of a superconducting material, and generates a rotating magnetic field, an inner rotor rotatably held at an inner circumferential side of the stator, and an outer rotor rotatably held at an outer circumferential side of the stator, wherein the inner rotor and the outer rotor each include at least one rotor winding selected from a superconducting squirrel cage winding (a) including a single or a plurality of rotor bars and end rings that are formed of a superconducting material, and a normal conduction squirrel cage winding (b) including a single or a plurality of rotor bars and end rings that are formed of a normal conducting material, and a rotor iron core including a plurality of slots that accommodate the respective rotor bars of the rotor winding.

According to the superconducting rotating machine of the present invention, a critical current in the iron core is high since the toroidal stator that is toroidally wound around the cylindrical stator iron core, and includes the superconducting material as the stator winding. Since the outer rotor rotatably held at the outer circumferential side of the stator is included, leakage magnetic flux to the outer side in the diameter direction of the stator can be used as the output (torque) of the rotating machine. Accordingly, the superconducting rotating machine of the present invention is excellent in energy conversion efficiency, and can further enhance the output (torque).

According to the superconducting rotating machine of the present invention, the outer rotor serves a function of a magnetic shield that prevents the leakage magnetic flux, and therefore an influence on the peripheral devices by the leakage magnetic flux can be suppressed.

As one aspect of the present invention, the superconducting rotating machine is provided, wherein at least one of the inner rotors and the outer rotor includes at least the superconducting squirrel cage winding (a) as the rotor winding.

According to the present aspect, the superconducting squirrel cage winding (a) is used in at least one of the inner rotor and the outer rotor, so that the rotor using the superconducting squirrel cage winding (a) captures magnetic flux in a superconducting state, and thereby synchronous rotation becomes possible.

As one aspect of the present invention, the superconducting rotating machine, is provided, wherein at least one of the inner rotor and the outer rotor includes the superconducting squirrel cage winding (a) and the normal conducting squirrel cage winding (b) as the rotor winding.

According to the present aspect, both the superconducting squirrel cage winding (a) and the normal conducting squirrel cage winding (b) are used as the rotor winding in at least one of the inner rotor and the outer rotor, so that the rotor using the superconducting squirrel cage winding (a) and the normal conducting squirrel cage winding (b) can perform both slip rotation and synchronous rotation by switching them.

As one aspect of the present invention, the superconducting rotating machine is provided, wherein the inner rotor and the outer rotor each include at least the superconducting squirrel cage winding (a) as the rotor winding.

According to the present aspect, the superconducting squirrel cage winding (a) is used in both the inner rotor and the outer rotor, so that both the inner rotor and the outer rotor capture magnetic flux in a superconducting state, and thereby synchronous rotation becomes possible.

As one aspect of the present invention, the superconducting rotating machine is provided, wherein the inner rotor and the outer rotor each include at least the superconducting squirrel cage winding (a) as the rotor winding, and a critical current (A1) for bringing the superconducting squirrel cage winding (a-1) of the inner rotor into a magnetic flux flow state and a critical current (A2) for bringing the superconducting squirrel cage winding (a-2) of the outer rotor into a magnetic flux flow state are different.

According to the present aspect, the inner rotor and the outer rotor include at least the superconducting squirrel cage winding (a) as the rotor winding, and the critical current (A1) of the inner rotor and the critical current (A2) of the outer rotor are different, so that timings for capturing magnetic flux in the superconducting state can be made different in the inner rotor and the outer rotor.

As one aspect of the present invention, the superconducting rotating machine is provided, wherein the inner rotor and the outer rotor each include at least the superconducting squirrel cage winding (a) as the rotor winding, and only the superconducting squirrel cage winding (a) of either one of the inner rotor and the outer rotor can be switched to a magnetic flux flow state.

According to the present aspect, it is possible to switch between bringing only the superconducting squirrel cage winding (a) of either one of the inner rotor and the outer rotor into the magnetic flux flow state and bringing both the rotors into the magnetic flux flow state, so that for example, by configuring only the superconducting squirrel cage winding (a) of either one of the inner rotor and the outer rotor to be able to be brought into the magnetic flux flow state at a time of light load, joule loss is reduced and the rotor can rotate with high efficiency even at the time of light load.

As one aspect of the present invention, the superconducting rotating machine is provided, wherein a critical current (A1) for bringing the superconducting squirrel cage winding (a-1) of the inner rotor into a magnetic flux flow state and a critical current (A2) for bringing the superconducting squirrel cage winding (a-2) of the outer rotor into a magnetic flux flow state are different, and only the superconducting squirrel cage winding (a) of either one of the inner rotor and the outer rotor can be switched to a magnetic flux flow state according to a difference between the critical current (A1) and the critical current (A2).

According to the present aspect, there is the difference between the critical current (A1) and the critical current (A2), so that at the time of light load (time of low current), an induction current for capturing magnetic flux can be passed to only the superconducting squirrel cage winding (a) with a low critical current in the synchronous rotation state. Thereby, it is possible to autonomously switch the mode of making it possible to bring only the superconducting squirrel cage winding (a) of either one of the inner rotor and the outer rotor into a magnetic flux flow state and the mode of making it possible to bring both the rotors into a magnetic flux flow state according to the load (rotation speed).

Advantageous Effect of Invention

According to the present invention, the superconducting rotating machine excellent in energy conversion efficiency can be provided.

DESCRIPTION OF EMBODIMENTS

Figure 1:
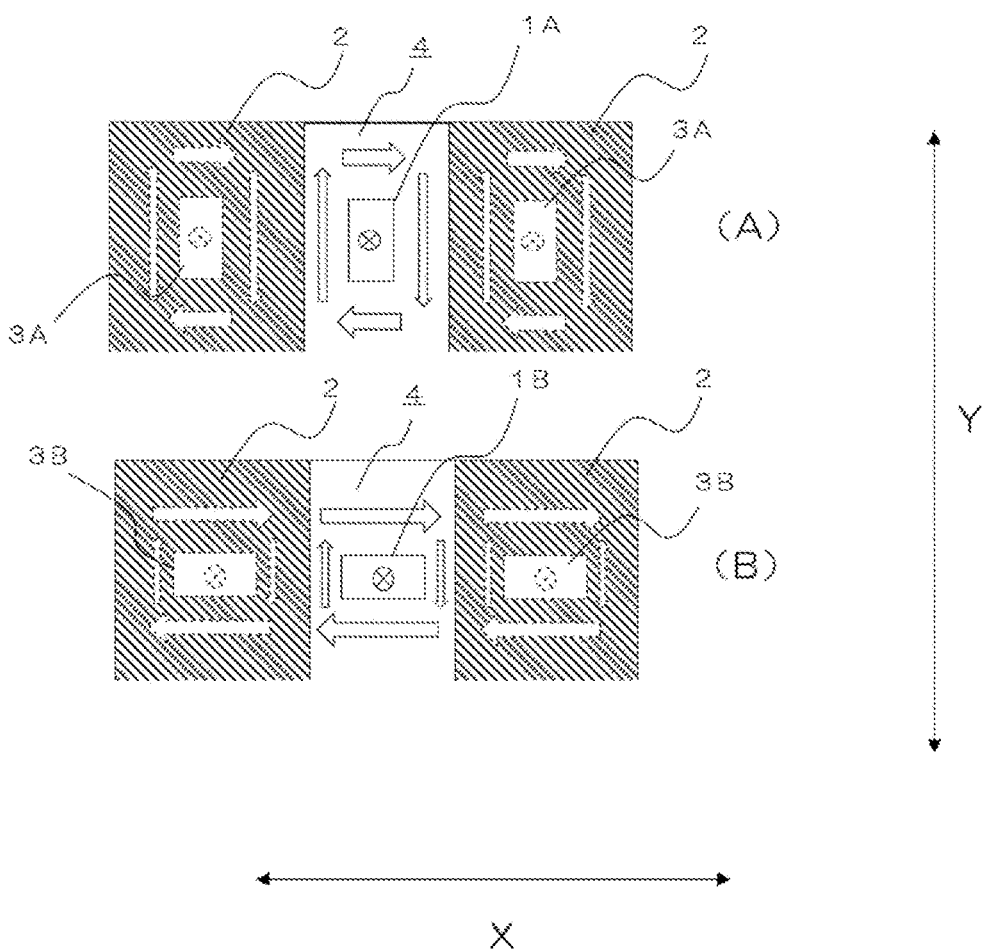
FIG. 1 is a schematic view for explaining a magnetic mirror image effect in a toroidal stator.

A superconducting rotating machine of the present invention uses a toroidal stator using a superconducting material and can enhance a critical current in a stator iron core. Hereinafter, a reason why the critical current in the stator iron core is enhanced by using the toroidal stator is described by using FIG. 1. FIG. 1 is a schematic view for explaining a magnetic mirror image effect in the toroidal stator, FIG. 1(A) shows a normal winding method, and FIG. 1(B) shows a toroidal winding.

When a current is passed to a superconducting material 1A (conductor) disposed between two magnetic bodies 2 from a front to a back of a paper surface, a magnetic field is generated in directions shown by arrows around the conductor 1A in the drawing by the right-hand corkscrew rule (i.e., Ampere's Right Hand rule), as shown in FIG. 1(A). At this time, in each of the magnetic bodies 2, a magnetic mirror image 3A shown by a broken line is generated. In a relationship with magnetic fields generated by the magnetic mirror images 3A, the magnetic fields in a space 4 where the superconducting material 1A is present are mutually strengthened in a magnetic flux direction (parallel direction with a direction shown by an arrow X in FIG. 1) parallel to the magnetic body 2, and are mutually weakened in a perpendicular direction (direction shown by an arrow Y in FIG. 1), due to the magnetic mirror image effect.

When a superconducting material having a sectional shape, which is a rectangle with a high aspect ratio, is used, a critical current is reduced more as a component (perpendicular magnetic field) that is applied in a perpendicular direction to a wide sectional surface among magnetic field vectors that are applied to the superconducting material becomes larger. Therefore, if a long side (wide sectional surface side) of the superconducting material 1A is disposed to be parallel to a depth direction of the magnetic body 2 (parallel direction to the direction shown by the arrow Y in FIG. 1) like a conventional winding method in FIG. 1(A), for example, directions in which the magnetic fields are strengthened and directions in which critical currents are weakened correspond to each other, and the critical current is greatly reduced by the magnetic components (parallel magnetic flux components) shown by thick arrows in a periphery of the superconducting material 1A. At this time, the critical current is also reduced by magnetic flux components shown by thin arrows in FIG. 1(A), but a degree of reduction is small. In other words, when the long side (wide sectional surface side) of the superconducting material 1A is disposed to be parallel to a depth direction of the magnetic body 2 (in the parallel direction with the direction shown by the arrow Y in FIG. 1) as shown in FIG. 1(A), a parallel magnetic field component that is strengthened by the magnetic mirror image effect corresponds to a direction in which the critical current of the superconducting material is weakened, so that the critical current is greatly reduced.

In contrast to this, when a long side (wide sectional surface side) of a superconducting material 1B a sectional shape of which is a rectangle with a high aspect ratio is disposed to be in a direction perpendicular to a depth direction of the magnetic body 2 (parallel direction with the direction shown by the arrow X in FIG. 1) as shown in FIG. 1(B), a critical current of the superconducting material 1B is greatly reduced by perpendicular magnetic field components shown by thin arrows in FIG. 1(B), but is not reduced so much in parallel magnetic field components shown by thick arrows in FIG. 1(B). In other words, in FIG. 1(B), the perpendicular magnetic field components that is weakened by the magnetic mirror image effect, and directions in which the critical current of the superconducting material is weakened (perpendicular directions to the wide surface) correspond to each other, so that a critical current in a magnetic body (iron core) can be enhanced as compared with FIG. 1(A). Note that in the present description, a relationship between "perpendicular" and "parallel" is a concept including a relationship between substantially perpendicular and substantially parallel.

Here, in general, many superconducting materials are highly brittle and have low flexibility. Among superconducting materials, many superconducting wire rods have rectangular sectional shapes with high aspect ratios. Therefore, when a stator is produced by using a superconducting material sectional shape of which is a rectangle, the superconducting material is often used as a configuration in which the superconducting material can be bent in a direction perpendicular to a long side, in order to wind the superconducting material around a stator iron core. In order to enhance the critical current in the stator iron core by using the magnetic mirror image effect as described above by using the superconducting material the sectional shape of which is a rectangle like this, the superconducting material is preferably installed in slots or grooves of the stator iron core so that a long side (wide sectional surface side) of the sectional shape (rectangle) is perpendicular to a radial direction (depth direction) of the stator. In this case, a direction in which the superconducting material of which sectional shape is a rectangle can be wound is a radial direction of the stator (that is, a direction perpendicular to the long side of the section of the superconducting material). Therefore, if the superconducting material is installed in the slots or the grooves of the stator iron core so that the long side (wide sectional surface side) of the sectional shape (rectangle) is perpendicular to the radial direction (depth direction) of the stator, the material is toroidally wound in order to wind the material around the stator. Therefore, it is possible to enhance the critical current in the stator iron core by toroidally winding the superconducting material around the stator iron core. However, as for a relationship of the long side (wide sectional surface side) of the sectional shape (rectangle) of the superconducting material and the radial direction (depth direction) of the stator, a long side direction itself of the slot may slightly incline (in a circumferential direction, for example) with respect to the radial direction of the stator, as long as relative spatial arrangement of a (perpendicular) slot inner space and the superconducting material is maintained.

Note that the superconducting material used in the stator in the present invention is not limited to the material having a rectangular section, but it is possible to use a bulk material or the like a sectional shape of which is a substantially circle or substantially square with a low aspect ratio, for example. Even when the material like this is used, it is possible to suppress reduction of the critical current of the superconducting material due to the magnetic flux components (that is, the aforementioned perpendicular magnetic field components) parallel to the radial direction of the stator iron core, by matching a c-axis direction of a crystal structure of the superconducting material with a direction of the magnetic field generated by the corkscrew rule as shown in FIG. 1(B), and therefore, it is possible to enhance the critical current in the stator iron core.

Hereinafter, a preferable embodiment of the present invention is described with reference to the drawings.

Figure 2:
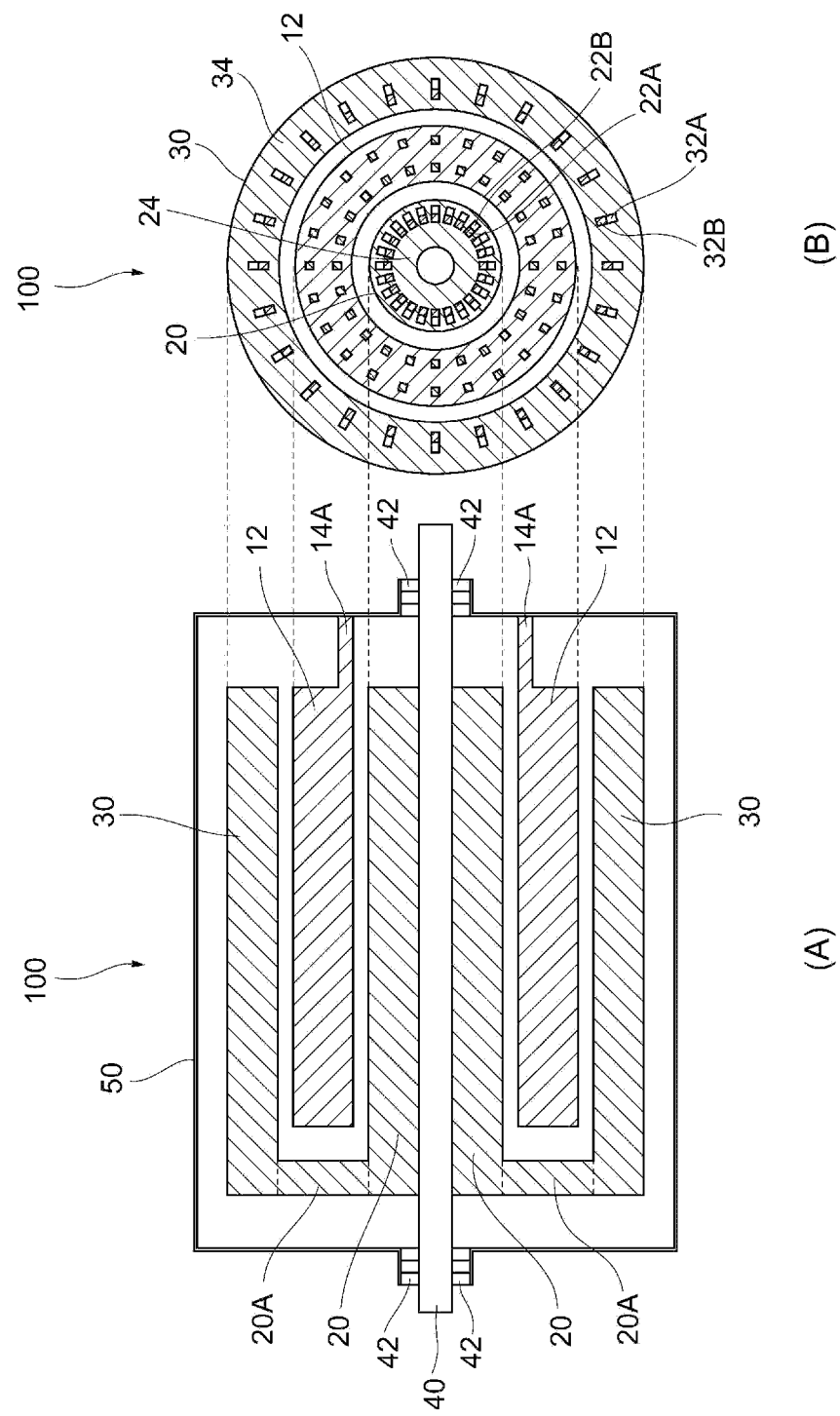
FIG. 2 is an explanatory view showing examples of a section in an axial direction and a section in a radial direction of a superconducting rotating machine.

FIG. 2 is an explanatory view showing examples of a section in an axial direction (see FIG. 2(A)) and a section in a radial direction (see FIG. 2(B)) of a superconducting rotating machine 100 of the present embodiment. As shown in FIG. 2, the superconducting rotating machine 100 includes a toroidal stator 12 that has a stator winding that is toroidally wound around a cylindrical stator iron core and formed of a superconducting wire rod, and generates a rotating magnetic field, an inner rotor 20 rotatably held at an inner circumferential side of the toroidal stator 12, and an outer rotor 30 rotatably held at an outer circumferential side of the toroidal stator 12. The toroidal stator 12, the inner rotor 20, and the outer rotor 30 are stored in a cylindrical case 50. As descried below, by passing a three-phase current to the toroidal stator 12, the inner rotor 20 and the outer rotor 30 rotate, and the superconducting rotating machine 100 can obtain high torque output while having excellent energy conversion efficiency.

(Toroidal Stator)

Figure 3:
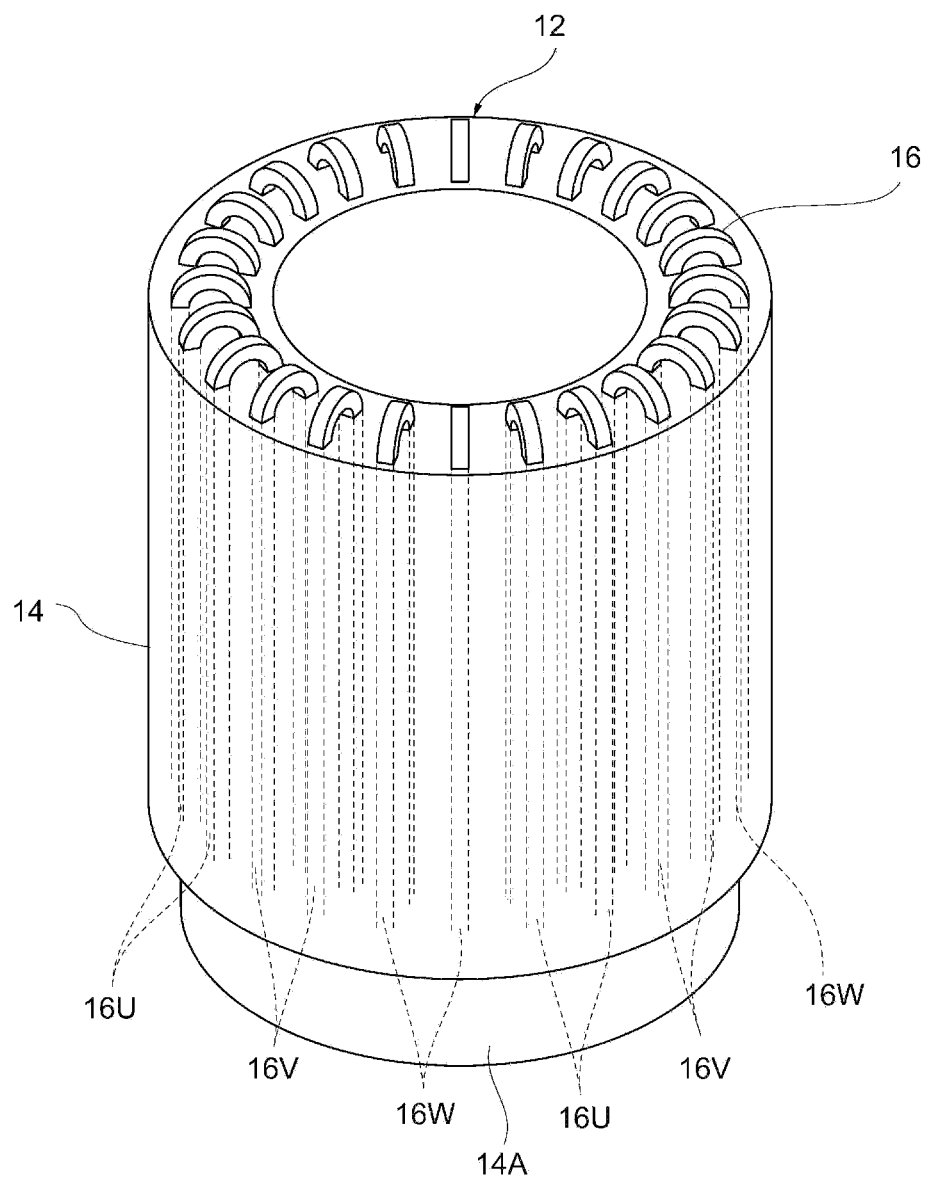
FIG. 3 is an explanatory view showing an example of a configuration of the toroidal stator.

FIG. 3 is an explanatory view showing an example of a configuration of the toroidal stator 12. As shown in FIG. 3, the toroidal stator 12 has a cylindrical stator iron core 14, and a stator winding 16 that is toroidally wound around the stator iron core 14 and formed of a superconducting wire rod, and by passing a three-phase current to the stator winding 16, a rotating magnetic field is generated.

The stator iron core 14 is a cylindrical member having a ring-shaped section in a radial direction. As the stator iron core 14, a member in which electromagnetic steel sheets such as silicon steel sheets are laminated in the axial direction can be used. In the stator iron core 14, slots not illustrated are provided, and the stator winding 16 is accommodated in the slots. As shown in FIG. 2, the stator iron core 14 is fixedly attached to an inner wall of the case 50 of the superconducting rotating machine 100 via a junction portion 14A. Note that in the present embodiment, the stator having the slots is used, but the present invention is not limited to this mode, and it is also possible to use a stator in which open slots or grooves are provided instead of the slots.

The stator winding 16 is formed by bundling a plurality of superconducting wiring rods (bismuth high-temperature superconducting wire rods in the present embodiment), and each of the wire rods has a rectangular sectional shape (however, the section is not limited to this section). Though not illustrated, the plurality of superconducting wire rods laminated in the radial direction of the stator are disposed so that a long side (wide sectional surface side) of a rectangular section of each of the wire rods perpendicularly intersects the radial direction of the stator. The superconducting wire rod is configured by covering a plurality of bismuth high-temperature superconducting filaments with a highly conductive metal such as a copper, aluminum, silver, or gold. From a viewpoint of easiness at a time of start of the superconducting rotating machine 100, as the superconducting wire rod used in the stator winding 16 of the toroidal stator 12a, a superconductive wire rod having a higher critical temperature than a critical temperature of at least one of superconducting wire rods used in superconducting squirrel cage windings 22A and 32A is preferably used. A reason thereof is described later.

As described above, the stator winding 16 is inserted through the slots on a surface of the stator iron core 14 and is toroidally wound around the stator iron core 14 and serves a function of a coil. In the present embodiment, 24 slots are provided to be arranged on each of an inner circumferential surface and an outer circumferential surface of the stator iron core 14 at equal intervals in a circumferential direction. The respective slots are formed to continue throughout the inner circumferential surface and the outer circumferential surface of the stator iron core. Throughout the present description, the case of being simply referred to as an "outer side" of the stator means an outer circumferential surface side of the stator, and the case of being referred to as an "inner side" of the stator means an inner circumferential surface side of the stator. As shown in FIG. 3, the stator winding 16 is disposed (wound) counterclockwise so that a rotating magnetic field can be produced in order of stator windings 16U, 16V and 16W along the circumferential direction of the stator iron core 14.

In the present embodiment, the stator windings 16 are three-phase windings and respective windings are connected. The superconducting rotating machine 100 is a three-phase motor, and each of the stator windings 16 is allocated to any one of a U-phase coil, a V-phase coil, and a W-phase coil. In other words, in the stator iron core 14, 24 superconducting coils are placed. That is to say, eight U-phase superconducting coils (stator windings 16U), eight V-phase superconducting coils (stator windings 16V), and eight W-phase superconducting coils (stator windings 16W) are placed in the stator iron core 14. The eight U-phase superconducting coils are respectively electrically connected in series, the eight V-phase superconducting coils are respectively electrically connected in series, and the eight W-phase superconducting coils are respectively electrically connected in series. Note that a connecting method of the respective stator windings 16 may be either series connection or parallel connection.

A wire connection method of the respective stator windings 16 is not particularly limited, and may be star connection, delta connection or the like. A winding method of the stator winding 16 to the stator iron core 14 may be concentrated winding or distributed winding. In the present embodiment, a rotating magnetic field with the number of poles=4 is formed in the stator iron core 14 by passing a three-phase current through the stator winding 16. Note that in the present embodiment, the number of turns per pole and per phase of the stator winding 16 is 12.

(Rotor)

Figure 4:
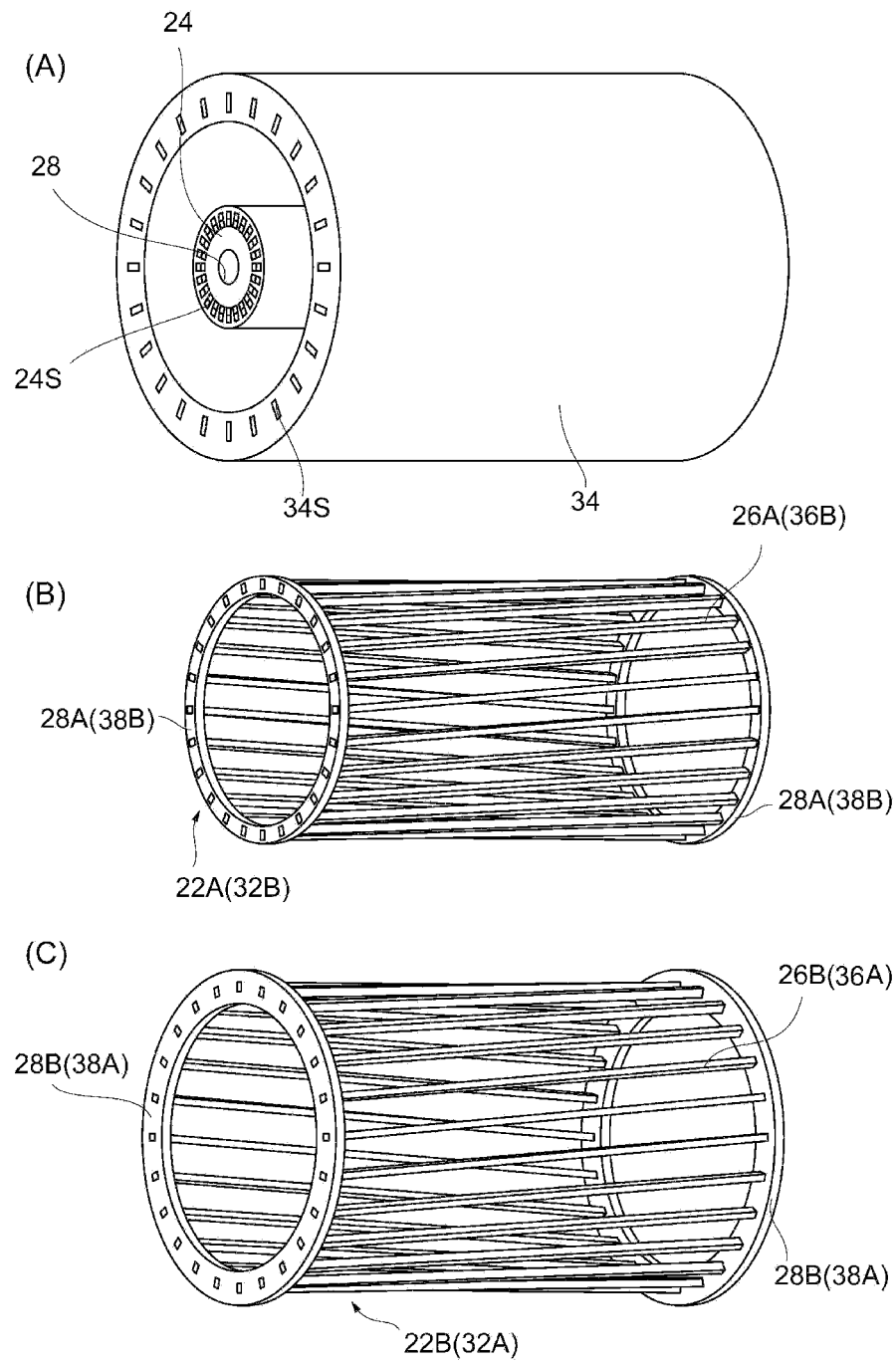
FIG. 4 is an explanatory view showing an example of a configuration of a rotor.

FIG. 4 is an explanatory view showing an example of a configuration of a rotor. More specifically, FIG. 4(A) shows a rotor iron core, FIG. 4(B) shows a superconducting squirrel cage winding (a), and FIG. 4(C) shows a normal conducting squirrel cage winding (b).

First, as shown in FIG. 2, the superconducting rotating machine 100 of the present embodiment includes an inner rotor 20 rotatably held at an inner circumferential side of the toroidal stator 12, and an outer rotor 30 rotatably held at an outer circumferential side. As shown in FIG. 2(A), in the present embodiment, the inner rotor 20 and the outer rotor 30 have respective rotor iron cores connected via a connection portion 20A, and the inner rotor 20 and the outer rotor 30 are configured to integrally rotate.

As shown in FIG. 2(B) and FIG. 4, the inner rotor 20 includes a superconducting squirrel cage winding 22A and a normal conducting squirrel cage winding 22B, and an inner rotor iron core 24. Likewise, the outer rotor 30 includes a superconducting squirrel cage winding 32A and a normal conducting squirrel cage winding 32B, and an outer rotor iron core 34. Note that as described above, the inner rotor iron core 24 and the outer rotor iron core 34 are connected via the connection portion 20A, and are configured to be integrated with each other.

—Inner Rotor—

As shown in FIG. 2, the inner rotor 20 is disposed at the inner circumferential side of the toroidal stator 12 with a predetermined space therebetween. As shown in FIG. 4(A), the inner rotor iron core 24 of the inner rotor 20 is cylindrical, and incudes a plurality of slots 24S that accommodate respective rotor bars of the rotor winding, at an outer circumferential surface side thereof. The inner rotor 20 includes a rotating shaft 40 that is attached coaxially with the inner rotor iron core 24. The inner rotor 20 includes the superconducting squirrel cage winding 22A having rotor bars 26A and end rings 28A formed of a superconducting wire rod and the normal conducting squirrel cage winding 22B having rotor bars 26B and end rings 28B formed of a normal conducting wire rod as shown in FIGS. 4(B) and (C). Note that in the present embodiment, the inner rotor having the slots is used, but the present invention is not limited to the mode, and it is also possible to use an inner rotor provided with open slots or grooves instead of the slots.

The inner rotor iron core 24 can be formed by laminating electromagnetic steel sheets such as silicon steel sheets in the axial direction. As shown in FIG. 4(A), in a center portion of the inner rotor iron core 24, a rotating shaft receiving hole 28 for receiving the rotating shaft 40 is formed. As described above, in a vicinity of an outer circumference of the inner rotor iron core 24, a plurality of slots 24S penetrating in the axial direction are formed at predetermined intervals in a circumferential direction. Note that in the present embodiment, the slot 24S is formed obliquely to the axial direction of the inner rotor iron core 24, and has an oblique slot (skew) configuration. However, the present invention is not limited to the mode, and for example, the slot 24S may be parallel to the axial direction of the inner rotor iron core 24 (angle formed by the axial direction of the inner rotor iron core 24 and the slot 24S is 0°).

The superconducting squirrel cage winding 22A is configured by a plurality of rotor bars 26A, and a pair of annular end rings 28A that respectively short-circuit both ends of the respective rotor bars 26A, as shown in FIG. 4(B). The plurality of rotor bars 26A are accommodated in the slots 24S of the inner rotor iron core 24.

The rotor bar 26A is formed by bundling a plurality of superconducting wire rods (bismuth high-temperature superconducting wire rods in the present embodiment), and has a rectangular section (however, not limited to the rectangular section). The superconducting wire rod can be configured by covering a plurality of bismuth high-temperature superconducting filaments with a highly conductive metal such as a copper, aluminum, silver, or gold, for example. The number of rotor bars 26A is the same as the number of slots 24S of the inner rotor iron core 24. In other words, in the present embodiment, the numbers of the rotor bars 26A and the slots 24S are each 24.

The rotor bars 26A are disposed at predetermined intervals in the circumferential direction, and are disposed obliquely to the axial direction of the cage to form a cage having a cylindrical shape and a skew structure. However, the present invention is not limited to the mode, and the superconducting squirrel cage winding 22A may be configured so that the rotor bars 26A are parallel to the axial direction of the inner rotor iron core 24 (angles formed by the axial direction of the inner rotor iron core 24 and the rotor bar 26A is 0°), for example.

The rotor bar 26A is formed to be longer than a length in the axial direction of the inner rotor iron core 24 and protrudes from the slot 24S when accommodated in the slot 24S. The end ring 28A is configured by using a superconducting wire rod such as a bismuth high-temperature superconducting wire rod, similarly to the rotor bar 26A. Respective end portions of the rotor bar 26A that protrudes from the slot 24S are respectively joined to the pair of end rings 28A.

The normal conducting squirrel cage winding 22B is configured by a plurality of rotor bars 26B, and a pair of annular end rings 28B that respectively short-circuit both ends of the respective rotor bars 26B, as shown in FIG. 4(C). The plurality of rotor bars 26B are accommodated in the slots 24S of the inner rotor iron core 24.

The rotor bar 26B is formed of a highly conductive material such as a copper, aluminum, silver, or gold, and has a rectangular section (however, not limited to the rectangular section). The number of rotor bars 26B is a same number as the number of slots 24S of the inner rotor iron core 24. In other words, in the present embodiment, the number of rotor bars 26B is 24. The rotor bars 26B are disposed at predetermined intervals in the circumferential direction and are disposed obliquely to the axial direction of the cage, so as to form a cage having a cylindrical shape and a skew structure and larger than the superconducting squirrel cage winding 22A. However, the present invention is not limited to the mode, and the superconducting squirrel cage winding 22B may be configured so that the rotor bars 26B are parallel to the axial direction of the inner rotor iron core 24 (angles formed by the axial direction of the inner rotor iron core 24 and the rotor bars 26B are 0°), for example.

The rotor bar 26B is formed to be longer than a length in the axial direction of the inner rotor iron core 24 and protrudes from the slot 24S when it is accommodated in the slot 24S. The rotor bar 26B is inserted to an outer side from the rotor bar 26A of the superconducting squirrel cage winding 22A, in the slot 24S. In other words, in the inner rotor 20, in the slot 24S, the rotor bar 26A formed of a superconducting wire rod is disposed at an inner side (center side), and the rotor bar 26B formed of a normal conducting wire rod is disposed at an outer side (outer circumferential side) thereof.

The end ring 28B is configured of a highly conductive material such as a copper, aluminum, silver, or gold similarly to the rotor bar 26B. Respective end portions of the rotor bar 26B protruding from the slot 24S are respectively joined to the pair of end rings 28B.

The rotating shaft 40 is attached by being inserted into the rotating shaft receiving hole 28 of the inner rotor iron core 24. The rotating shaft 40 is rotatably supported in the case 50 via a bearing 42 such as a bearing.

—Outer Rotor—

As shown in FIG. 2, the outer rotor 30 is disposed at the outer circumferential side of the toroidal stator 12 with a predetermined space therebetween. As shown in FIG. 4(A), the outer rotor iron core 34 of the outer rotor 30 is cylindrical, and includes a plurality of slots 34S that accommodate respective rotor bars of the rotor winding at an inner circumferential surface side thereof. The outer rotor 30 includes a superconducting squirrel cage winding 32A having rotor bars 36A and end rings 38A formed of a superconducting wire rod, and a normal conducting squirrel cage winding 32B having rotor bars 36B and end rings 38B formed of a normal conducting wire rod shown in FIGS. 4(B) and (C). Note that the superconducting squirrel cage winding 32A has a substantially similar configuration to the normal conducting squirrel cage winding 22B of the inner rotor 20 except for a size and the material. Likewise, the normal conducting squirrel cage winding 32B has a substantially similar configuration to the superconducting squirrel cage winding 22A of the inner rotor 20, except for a size and the material. Therefore, in the superconducting squirrel cage winding 32A and the normal conducting squirrel cage winding 32B, corresponding reference signs are given in parentheses in each of FIGS. 4(B) and (C).

The outer rotor iron core 34 can be formed by laminating electromagnetic steel sheets such as silicon steel sheets in an axial direction. As described above, a plurality of slots 34S penetrating in the axial direction are formed at predetermined intervals in the circumferential direction, in a vicinity of an inner circumference of the outer rotor iron core 34. Note that the slot 34S is formed obliquely to the axial direction of the outer rotor iron core 34, and has an oblique slot (skew) configuration. As shown in FIG. 2, the outer rotor iron core 34 and the inner rotor iron core 24 are connected at one end portions via the connection portion 20A. However, the present invention is not limited to this mode, and the slots 34S may be parallel to the axial direction of the outer rotor iron core 34 (angles formed by the axial direction of the outer rotor iron core 34 and the slots 34S are 0°), for example. Note that in the present embodiment, the outer rotor provided with the slots is used, but the present invention is not limited to this mode, and it is also possible to use an outer rotor provided with open slots or grooves instead of the slots.

The superconducting squirrel cage winding 32A is configured by a plurality of rotor bars 36A, and a pair of annular end rings 38A that respectively short-cut both ends of the respective rotor bars 36A, as shown in FIG. 4(C). The plurality of rotor bars 36A are accommodated in the slots 34S of the outer rotor iron core 34.

The rotor bar 36A is formed by bundling a plurality of superconducting wire rods (bismuth high-temperature superconducting wire rods in the present embodiment), and has a rectangular section (however, not limited to the rectangular section). The superconducting wire rod can be configured by covering a plurality of bismuth high-temperature superconducting filaments with a highly conductive metal such as a copper, aluminum, silver, or gold, for example. The number of rotor bars 36A is a same number as the number of slots 34S of the outer rotor iron core 34. In other words, in the present embodiment, the numbers of rotor bars 36A and slots 34S are each 24.

The rotor bars 36A are disposed at predetermined intervals in a circumferential direction and are disposed obliquely to the axial direction of the cage to form a cage having a cylindrical shape and a skew structure. However, the present invention is not limited to the mode, and the superconducting squirrel cage winding 32A may be configured so that the rotor bars 36A are parallel to the axial direction of the outer rotor iron core 34 (angles formed by the axial direction of the outer rotor iron core 34 and the rotor bars 36A are 0°), for example.

The rotor bar 36A is formed to be longer than a length in the axial direction of the outer rotor iron core 34, and protrudes from the slot 34S when it is accommodated in the slot 34S. The end ring 38A is configured by using a superconducting wire rod such as a bismuth high-temperature superconducting wire rod similarly to the rotor bar 36A. Respective end portions of the rotor bar 36A protruding from the slot 34S are respectively joined to the pair of end rings 38A.

As shown in FIG. 4(B), the normal conducting squirrel cage winding 32B is configured by a plurality of rotor bars 36B, and a pair of annular end rings 38B that respectively short-cut both ends of the respective rotor bars 36B. The plurality of rotor bars 36B are accommodated in the slots 34S of the outer rotor iron core 34.

The rotor bar 36B is formed of a highly conductive material such as a copper, aluminum, silver, or gold, and has a rectangular section (however, not limited to the rectangular section). The number or rotor bars 36B is a same number as the number of slots 34S of the outer rotor iron core 34. In other words, in the present embodiment, the number of rotor bars 36B is 24. The rotor bars 36B are disposed at predetermined intervals in the circumferential direction and are disposed obliquely with respect to the axial direction of the cage so as to form a cage having a cylindrical shape and a skew structure and smaller than the superconducting squirrel cage winding 32A. However, the present invention is not limited to this mode, and the superconducting squirrel cage winding 32A may be configured so that the rotor bars 36B are parallel to the axial direction of the outer rotor iron core 34 (angles formed by the axial direction of the outer rotor iron core 34 and the rotor bars 36B are 0°), for example.

The rotor bar 36B is formed to be longer than the length in the axial direction of the outer rotor iron core 34, and protrudes from the slot 34S when it is accommodated in the slot 34S. The rotor bar 36B is inserted to an inner side from the rotor bar 36A of the superconducting squirrel cage winding 32A, in the slot 34S. In other words, in the outer rotor 30, the rotor bar 36B formed of a normal conducting wire rod is disposed at the inner side (center side), and the rotor bar 36A formed of a superconducting wire rod is disposed at an outer side (outer circumferential side) thereof, in the slot 34S.

The end ring 38B is configured of a highly conductive material such as a copper, aluminum, silver, or gold similarly to the rotor bar 36B. Respective end portions of the rotor bar 36B protruding from the slot 34S are respectively joined to the pair of end rings 38B.

According to the superconducting rotating machine 100 configured as described above, when the rotating machine is driven, at least the stator winding 16 of the toroidal stator 12 configured by using a superconducting wire rod is cooled first and is brought into a superconducting state. At this time, the superconducting squirrel cage winding 22A of the inner rotor 20 and the superconducting squirrel cage winding 32A of the outer rotor 30 are preferably cooled simultaneously. Subsequently, when a three-phase AC current is applied to the superconducting rotating machine 100, the current flows through the stator winding 16 of the toroidal stator 12, and a rotating magnetic field is generated in the stator iron core 14. Since the toroidal stator 12 is used in the present embodiment, a rotating magnetic field is generated at this time not only at the inner circumferential side but also at the outer circumferential side of the toroidal stator 12.

Figure 5:
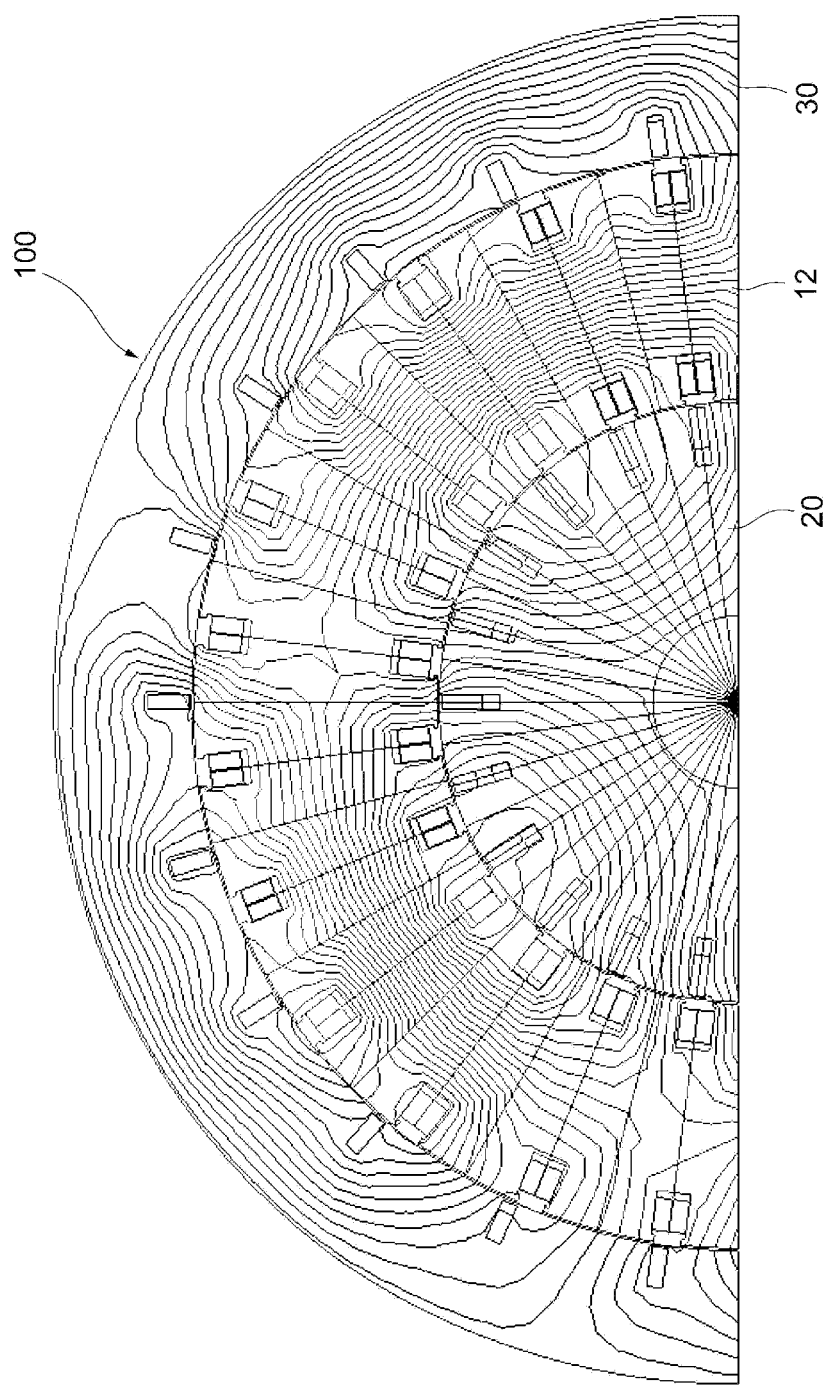
FIG. 5 is a view showing magnetic flux lines (FEM analysis result) when the superconducting rotating machine is energized.

FIG. 5 is a view showing magnetic flux lines (FEM analysis result) when the superconducting rotating machine is energized. As shown in FIG. 5, it is known that when the three-phase AC current is applied to the superconducting rotating machine 100 of the present embodiment, magnetic flux lines are generated at both the inner circumferential side and the outer circumferential side of the toroidal stator 12.

Figure 6:
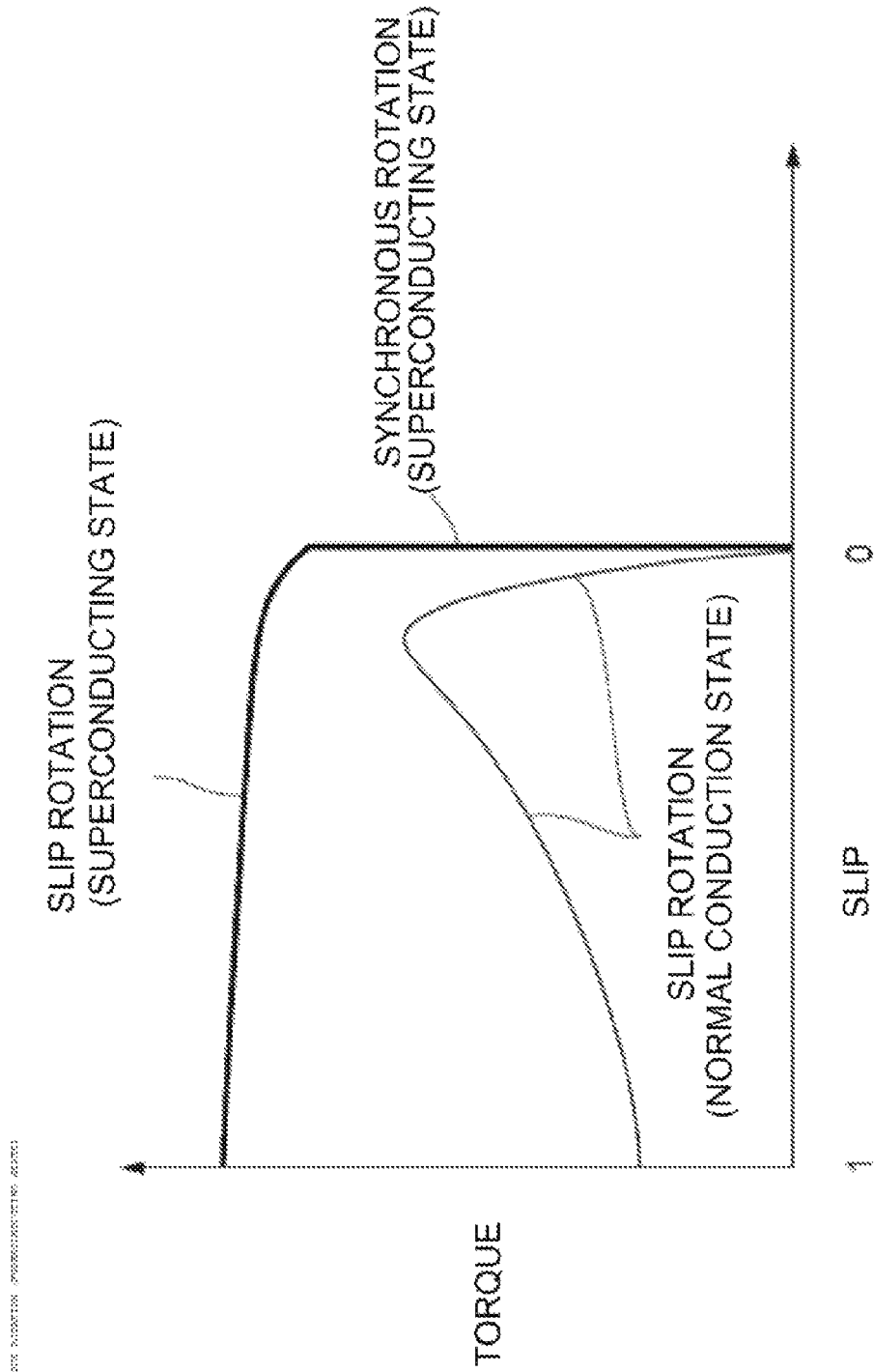
FIG. 6 is a graph showing relationships between torque and slip at a time of slip rotation in a normal conducting state and at a time of slip or synchronous rotation in a superconducting state.

When the superconducting squirrel cage windings 22A and 32A are in a normal conducting state (non-superconducting state), an induction current flows through the normal conducting squirrel cage windings 22B and 32B due to the rotating magnetic field by the toroidal stator 12, and induction (slip) torque is generated. At this time, the superconducting rotating machine 100 rotates mainly by the induction (slip) torque, and the respective rotors exhibit torque characteristics corresponding to "slip rotation (normal conducting state)" shown in FIG. 6. FIG. 6 is a graph showing relationships of torque and slip in a slip rotation time in the normal conducting state and in the slip or synchronous rotation time in the superconducting state.

Note that in a state where the superconducting rotating machine 100 performs slip rotation, some induction current also flows through the superconducting squirrel cage windings 22A and 32A. However, since the induction current flowing through the normal conducting squirrel cage winding 22B is much larger, induction (slip) torque generated in the normal conducting squirrel cage windings 22B and 32B becomes more dominant than the induction (slip) torque generated in the superconducting squirrel cage windings 22A and 32A.

Figure 7:
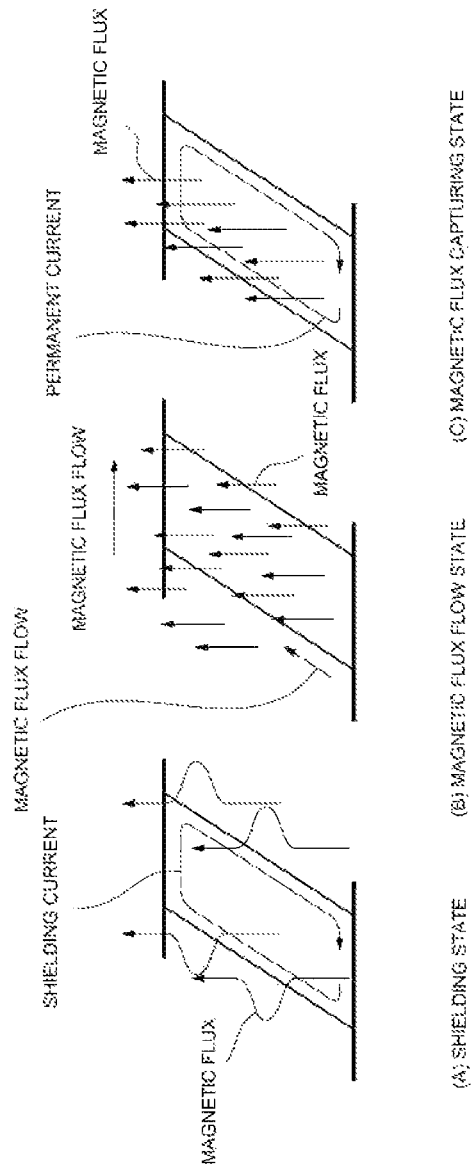
FIG. 7 is a schematic view for explaining a shielding state, a magnetic flux flow state and a magnetic flux capturing state.

According to the superconducting rotating machine 100, when the superconducting squirrel cage windings 22A and 32A are brought into the superconducting state from the normal conducting state, the superconducting squirrel cage windings 22A and 32A capture magnetic flux of the rotating magnetic field by the toroidal stator 12, and thereby synchronous torque is generated (see FIG. 7(C)). At this time, the superconducting rotating machine 100 rotates mainly by the synchronous torque, and the respective rotors exhibit torque characteristics corresponding to "synchronous rotation (superconducting state)" shown in FIG. 6. Note that in the synchronous rotation time, very slight slip may be generated due to an influence of a connection resistance of the respective rotor bars and end rings, and the like, but it can be regarded as synchronous rotation as a device characteristic.

Even if an excessively heavy load is applied to the superconducting rotating machine 100 in the state of performing synchronous rotation, the superconducting squirrel cage windings 22A and 32A shift to a magnetic flux flow state (see FIG. 7(B)) and can continue operation mainly by induction (slip) torque. The induction (slip) torque at this time is provided from both the normal conducting squirrel cage windings 22B and 32B arranged side by side with the superconducting squirrel cage windings 22A and 32A in the magnetic flux flow state, and the respective rotors exhibit torque characteristics corresponding to "slip rotation (superconducting state)" shown in FIG. 6.

In other words, the superconducting rotating machine 100 has the torque characteristics as shown in FIG. 6 in the respective rotors, and the respective rotors rotate mainly by the induction (slip) torque in the normal conducting state, whereas in the superconducting state, the respective rotors rotate mainly by the synchronous torque at a time of a normal load and rotate mainly by the induction (slip) torque at a time of an excessive load.

[Drive Method of Superconducting Rotating Machine]

The superconducting rotating machine 100 configured as described above can be applied to applications in which rotating machines are used such as automobiles (small cars, medium cars, large cars such as a bus and truck), trains, submarines, aircraft, and ship, for example, and can be applied to the superconducting motor system described in International Publication No. WO2009/116219, for example.

For example, the superconducting rotating machine 100 can be applied to a system including driven means such as wheels, propellers, and screws that rotate by being connected to rotating machines. The system is configured by including, for example, the superconducting rotating machine 100, the driven means such as wheels that are connected to the superconducting rotating machine 100 directly or via other members, a cooling device that can cool the superconducting rotating machine 100 to a superconducting state, a control device that controls the cooling device according to a cooling signal and controls the superconducting rotating machine 100 via an inverter according to a motor drive signal, and a battery for driving the superconducting rotating machine 100.

The cooling device is not particularly limited as long as it can cool the toroidal stator 12 using superconductivity, and the superconducting squirrel cage windings 22A and 32A in the superconducting rotating machine 100 to a superconducting state (below the critical temperature), but for example, a cooling device using helium gas or liquid nitrogen as a refrigerant can be used.

The control device is not particularly limited as long as it is a device that can drive and control the superconducting rotating machine 100 via a power supply device such as an inverter according to an electric motor drive signal. For example, the control device controls an amplitude and a frequency of an AC voltage that is applied to the stator winding 16 of the superconducting rotating machine 100 via the power supply device such as an inverter. Thereby, the control device can execute a feed-back control of a rotation speed and torque of the superconducting rotating machine 100. The control device preferably contains in advance a control pattern for slip rotation (first control pattern) that is used when the superconducting rotating machine 100 rotates mainly by induction (slip) torque, and a control pattern for synchronous rotation (second control pattern) that is used when the superconducting rotating machine 100 rotates mainly by synchronous torque. Here, as the control pattern for slip rotation, a known control pattern that is used for the conventional induction electric motors can be adopted. Likewise, as the control pattern for synchronous rotation, a known control pattern that is used for the conventional synchronous electric motors can be adopted.

The control device can be configured to determine whether or not the superconducting squirrel cage windings 22A and 32A are in a superconducting state (whether or not the superconducting rotating machine 100 rotates mainly by the synchronous torque) by monitoring a primary current signal that is a signal of a primary current flowing in the stator windings 16, or the like, from the superconducting rotating machine 100. The control device can be configured to apply the control pattern for synchronous rotation to the superconducting rotating machine 100 when the rotor rotates mainly by the synchronous torque, but otherwise, determine that the rotor rotates mainly by induction (slip) torque and apply the control pattern for slip rotation.

The control device can be configured to increase an applied voltage to the stator winding 16 and/or a frequency of the applied voltage so as to bring the superconducting squirrel cage windings 22A and 32A into a magnetic flux flow state, when the superconducting squirrel cage windings 22A and 32A are in a superconducting state in a state in which the superconducting squirrel cage windings 22A and 32A do not capture the magnetic flux of the rotating magnetic field by the stator winding 16. The superconducting squirrel cage windings 22A and 32A are temporarily brought into a magnetic flux flow state, and thereby can capture linkage magnetic flux even in a state below the critical temperature.

For example, when the superconducting squirrel cage windings 22A and 32A are cooled to below the critical temperature by the cooling device before start of operation, the superconducting squirrel cage windings 22A and 32A are in a superconducting state, in a state in which the superconducting squirrel cage windings 22A and 32A do not capture the magnetic flux by the stator winding 16. When an AC voltage is applied to the stator winding 16 in this state, a shielding current flows through the superconducting squirrel cage windings 22A and 32A, and the magnetic flux that links to the superconducting squirrel cage windings 22A and 32A and the normal conducting squirrel cage windings 22B and 32B is zero (see FIG. 7(A)). In this case, synchronous torque is not generated, and no induction current flows through the normal conducting squirrel cage windings 22B and 32B, so that induction (slip) torque is not generated, either. Accordingly, in this state, the superconducting rotating machine 100 cannot be operated.

Thus, the control device increases the applied voltage to the stator winding 16 and/or the frequency of the applied voltage until the shielding current flowing through the superconducting squirrel cage windings 22A and 32A exceeds the critical current, and brings the superconducting squirrel cage windings 22A and 32A into a magnetic flux flow state. Since finite resistance occurs in the magnetic flux flow state, the magnetic flux can link to the superconducting squirrel cage windings even when the superconducting squirrel cage windings remain below the critical temperature (see FIG. 7(B)).

Thereafter, the inner rotor 20 and the outer rotor 30 are accelerated, and when a relative speed of the rotating magnetic field, and the inner rotor 20 and the outer rotor 30 decreases with this, the current flowing through the superconducting squirrel cage windings 22A and 32A automatically decreases. When the current flowing through the superconducting squirrel cage windings 22A and 32A ultimately falls below the critical current, the superconducting squirrel cage windings 22A and 32A capture the linkage flux (see FIG. 7(C)).

An example of a method of driving the system using the superconducting rotating machine 100 is described below. However, the present invention is not limited to this mode. Note that in the below, an example is described, in which as the superconducting wire rod used in the stator winding 16 of the toroidal stator 12, a superconducting wire rod having a higher critical temperature than a critical temperature of at least one of the superconducting wire rods used in the superconducting squirrel cage windings 22A and 32A is used.

First, in order to bring the toroidal stator 12 in a superconducting state, the stator winding 16 is cooled to below a critical temperature of the superconducting wire rod used for the winding by the cooling device. At this time, the cooling temperature is set as a temperature that is not higher than the critical temperature of the superconducting wire rod used in the stator winding 16 of the toroidal stator 12, and is higher than the critical temperature of at least one of the superconducting wire rods used in the superconducting squirrel cage windings 22A and 32A, and the superconducting rotating machine 100 is started in a state in which at least one of the superconducting squirrel cage windings 22A and 32A is in a normal conducting state.

After the toroidal stator 12 is brought into the superconducting state, in an initial state in which the magnetic flux linking to the superconducting squirrel cage windings 22A and 32A is zero, an AC voltage is applied to the stator winding 16. At this time, when both the superconducting squirrel cage windings 22A and 32A are in a state cooled below the critical temperatures, that is, both the superconducting squirrel cage windings 22A and 32A are in a superconducting state, even if the rotating magnetic fields occur at the inner side and the outer side of the stator winding 16 in the case where the shielding currents flowing through the superconducting squirrel cage windings 22A and 32A are below the critical currents thereof, the magnetic flux linking to the superconducting squirrel cage windings 22A and 32A and the normal conducting squirrel cage windings 22B and 32B is zero, and the superconducting rotating machine 100 does not operate.

In contrast to this, when as the superconducting wire rod used in the stator winding 16 of the toroidal stator 12, the superconducting wire rod having a higher critical temperature than the critical temperature of at least one of the superconducting wire rods used in the superconducting squirrel cage windings 22A and 32A is used, at least one of the superconducting squirrel cage windings 22A and 32A is in a normal conducting state, so that in the rotor in the normal conducting state, induction (slip) torque occurring to the normal conducting squirrel cage windings 22B or 32B becomes dominant. In other words, the superconducting rotating machine 100 rotates by the induction (slip) torque of the rotor that is not in a superconducting state.

When both or either one of the superconducting squirrel cage windings 22A and 32A are or is in the normal conducting state, cooling is continued. In this case, the superconducting rotating machine 100 still operates as an induction electric motor until either one of the superconducting squirrel cage windings 22A and 32A is below the critical temperature.

When both the superconducting squirrel cage windings 22A and 32A are below the critical temperature and shift to the superconducting state, after a predetermined time elapses, the control device increases the applied voltage to the stator winding 16 and/or the frequency of the applied voltage until the shielding currents flowing through the superconducting squirrel cage windings 22A and 32A exceed the critical currents, and brings the superconducting squirrel cage windings 22A and 32A into a magnetic flux flow state. In the magnetic flux flow state, the magnetic flux can link to the respective superconducting squirrel cage windings even in the state below the critical temperatures.

Thereafter, the inner rotor 20 and the outer rotor 30 are accelerated, and when the relative speed of the rotating magnetic field, and the inner rotor 20 and the outer rotor 30 decreases with this, the currents flowing through the superconducting squirrel cage windings 22A and 32A automatically decrease. When the currents flowing through the superconducting squirrel cage windings 22A and 32A are ultimately below the critical currents, the superconducting squirrel cage windings 22A and 32A capture linkage magnetic flux. Subsequently, the superconducting rotating machine 100 rotates mainly by synchronous torque. The control device applies the control pattern for synchronous rotation to the superconducting rotating machine 100 that rotates mainly by the synchronous torque, and drives and controls the superconducting rotating machine 100. In other words, in the superconducting state, the superconducting rotating machine 100 exhibits a torque characteristic corresponding to "synchronous rotation (superconducting state)" in FIG. 6.

[Effect]

According to the superconducting rotating machine 100 configured as above, the toroidal stator using a superconducting wire rod is used as the stator, so that the critical current in the stator iron core is high. Therefore, strength of the magnetic field generated from the stator can be enhanced, and output (torque) of the rotating machine can be improved. According to the superconducting rotating machine 100, leakage magnetic flux generated at the outer side of the toroidal stator can be converted into torque by the outer rotor 30. Therefore, it is possible to enhance the output of the rotating machine while exhibiting excellent energy conversion efficiency.

For example, under the conditions below, outputs (torque/Nm) to a driving time were compared with respect to the superconducting rotating machines of examples and a comparative example.

In each of the examples, a superconducting rotating machine having a toroidal stator, an inner rotor and an outer rotor was used. In the comparative example, a superconducting rotating machine having a toroidal stator and an inner rotor was used. Note that the following conditions are common in the superconducting rotating machines of both the examples and the comparative example (the superconducting rotating machine of the comparative example has a configuration without having an outer rotor with respect to the superconducting rotating machine of the examples). A result is shown in FIG. 8.

Figure 8:
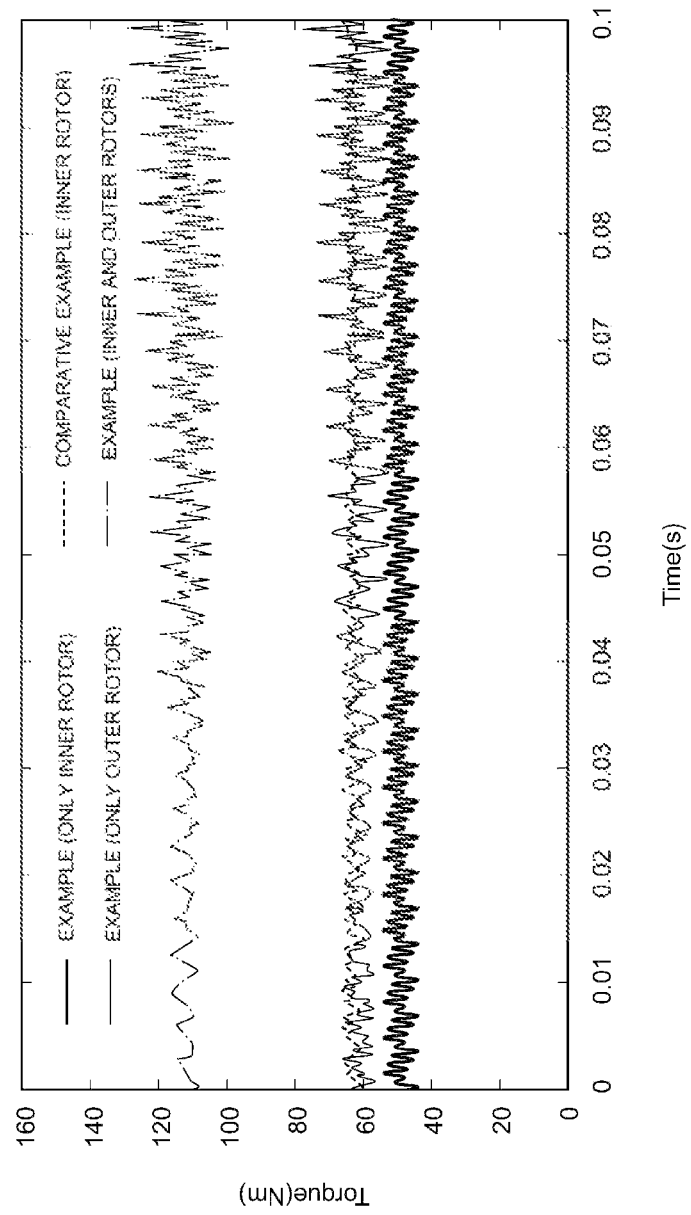
FIG. 8 is a graph showing a result of outputs (torque/Nm) to a driving time with respect to a plurality of superconducting rotating machines.

(Conditions)
  Outside diameter of the inner rotor: 174.8 mm
  Inside diameter of the stator: 176.0 mm
  Outside diameter of the stator: 318.0 mm
  Inside diameter of the outer rotor: 319.2 mm
  Outside diameter of the outer rotor: 400.0 mm
  Shaft length: 102.0 mm
  Number of turns per pole per phase: 12
  Number of poles: 4
  Gap length: 0.6 mm
  Rotation speed (Rotation speed): 1497 rpm
  Slip: 0.00133
  Current: 50 A (effective value)
  Voltage: 82 V (effective value)
  Frequency: 50 Hz In FIG. 8, the superconducting rotating machine of the examples is used, a result of measuring torques of both the inner rotor and the outer rotor (hereinafter, example (1)) is shown by an "alternate long and short dash line", a result of measuring only the torque of the inner rotor (hereinafter, example (2)) is shown by a "thick line", and a result of measuring only the torque of the outer rotor (hereinafter, example (3)) is shown by a "thin line". A result of measuring torque of an inner rotor by using the superconducting rotating machine of the comparative example is shown by a "chain line". As shown in FIG. 8, in the example (1) in which the torques of both the inner rotor and the outer rotor were measured, the average torque was approximately 110 Nm from 0 to 0.1 second and kept 100 Nm or more. In contrast to this, the average torque of the superconducting rotating machine (only the inner rotor) of the comparative example was approximately 60 Nm from 0 to 0.1 second. As a result, it has proven that the superconducting rotating machine of the examples has higher torque as compared with the comparative example, and is excellent in energy efficiency. Note that the torque of the inner rotor (example (2)) and the torque of the outer rotor (example (3)) in the superconducting rotating machine of the examples were respectively approximately 50 Nm and approximately 60 Nm from 0 to 0.1 second.

According to the superconducting rotating machine 100, the outer rotor 30 serves a function of a magnetic shield that prevents leakage magnetic flux at the outer side in the radial direction of the toroidal stator 12. Therefore, it is possible to suppress an influence on the peripheral devices by the leakage magnetic flux from the superconducting rotating machine 100 without additionally providing a magnetic shield.

Since both a superconducting squirrel cage winding (a) and a normal conducting squirrel cage winding (b) are used for each of the inner rotor 20 and the outer rotor 30 as the rotor windings, the superconducting rotating machine 100 is capable of slip rotation and synchronous rotation. Therefore, it is possible to operate with high efficiency during synchronous rotation, and it is possible to operate by slip rotation when pulling out of synchronism occurs due to some reason, or until the superconducting state is brought about.

In the superconducting rotating machine 100, as the superconducting wire rod for use in the stator winding 16 of the toroidal stator 12, the superconducting wire rod having a higher critical temperature than the critical temperature of at least one of the superconducting wire rods used in the superconducting squirrel cage windings 22A and 32A is used, and thereby the superconducting rotating machine 100 can be started by slip rotation. Therefore, at the time of start, it is not necessary to bring the superconducting squirrel cage windings 22A and 32A into a magnetic flux flow state to increase the applied voltage to the stator winding 16 and/or the frequency of the applied voltage, until the shielding currents flowing into the superconducting squirrel cage windings 22A and 32A exceed the critical currents, and start of the superconducting rotating machine 100 can be smoothly performed.

According to the superconducting rotating machine 100, the superconducting squirrel cage windings 22A and 32A are configured by the superconducting wire rod, so that elimination of heat is good when heat generation occurs, as compared with the case of using a superconducting bulk material. Since the superconducting squirrel cage windings 22A and 32A of the superconducting rotating machine 100 are formed of a superconducting wire rod with a small current capacity, and therefore, can be easily brought into a magnetic flux flow state as compared with the case of using a superconducting bulk material having a large current capacity. Therefore, according to the superconducting rotating machine 100, even when the superconducting squirrel cage windings 22A and 32A are in the superconducting state without capturing magnetic flux, the superconducting squirrel cage windings 22A and 32A can easily capture linkage magnetic flux and perform synchronous rotation by being temporarily brought into the magnetic flux flow state.

MODIFICATIONS

The present embodiment is specifically described above, and the present embodiment can be carried out by being modified as follows.

First Modification

For example, in the example described above, the mode in which both the inner rotor 20 and the outer rotor 30 each have at least both the superconducting squirrel cage winding (a) and the normal conducting squirrel cage winding (b) as the rotor windings is described, for example, but the present invention is not limited to the mode. For example, a superconducting rotating machine 100 may have a mode in which both an inner rotor 20 and an outer rotor 30 each have only a normal conducting squirrel cage winding (b). In this case, the superconducting rotating machine functions as only a slip rotation motor.

Second Modification

A superconducting rotating machine 100 may have a mode in which only one of an inner rotor and an outer rotor has at least a superconducting squirrel cage winding (a) as a rotor winding. For example, while slip rotation is performed in either one of the rotors, the other rotor is controlled to be switched to synchronous rotation, and thereby switching of output (torque) of the rotating machine can be controlled.

Third Modification

A superconducting rotating machine 100 may have a mode in which both an inner rotor 20 and an outer rotor 30 each have only a superconducting squirrel cage winding (a), for example. In this case, the superconducting rotating machine functions as only a rotating motor that drives mainly by synchronous torque.

Fourth Modification

In the superconducting rotating machine 100, as the superconducting wire rod for use in the stator winding 16 of the toroidal stator 12, the superconducting wire rod having a higher critical temperature than the critical temperature of at least one of the superconducting wire rods that are used in the superconducting squirrel cage windings 22A and 32A is used, but the present invention is not limited to the mode. It is possible to start the superconducting rotating machine 100 even when the critical temperature of the superconducting wire rod used in the stator winding 16 is equal to or lower than the critical temperatures of the superconducting wire rods that are used in the superconducting squirrel cage windings 22A and 32A, for example.

For example, when all of the stator winding 16 of a toroidal stator 12 and the superconducting squirrel cage windings 22A and 32A are in a superconducting state, magnetic flux that links to the superconducting squirrel cage windings 22A and 32A and normal conducting squirrel cage windings 22B and 32B is zero, and the superconducting rotating machine 100 does not operate as described above. In this case, a control device increases an applied voltage to the stator winding 16 and/or a frequency of the applied voltage until shielding currents flowing through the superconducting squirrel cage windings 22A and 32A exceed critical currents, and thereby can bring the superconducting squirrel cage windings 22A and 32A into a magnetic flux flow state. In the magnetic flux flow state, the magnetic flux can link to the superconducting squirrel cage winding even if the temperature remains in a state below a critical temperature.

Thereafter, an inner rotor 20 and an outer rotor 30 are accelerated, and when a relative speed of a rotating magnetic field, and the inner rotor 20 and the outer rotor 30 decreases with this, currents flowing through the superconducting squirrel cage windings 22A and 32A automatically decrease. When the currents flowing through the superconducting squirrel cage windings 22A and 32A are finally below the critical currents, the superconducting squirrel cage windings 22A and 32A capture linkage magnetic flux. A superconducting electric motor 100 can be rotated mainly by synchronous torque.

Fifth Modification

In the superconducting rotating machine 100, only the superconducting wire rod is used in the stator winding 16 of the toroidal stator 12, but the present invention is not limited to this mode. For example, a toroidal stator 12 may have another winding (normal conducting winding) using a normal conducting wire rod besides a stator winding 16. In this case, for example, a superconducting rotating machine 100 can be configured to be able to form magnetic poles in the toroidal stator 12 by the normal conducting winding, and to be also able to generate a rotating magnetic field in a normal conducting state. According to the configuration, for example, even before the superconducting wire rod of the stator winding 16 is in the superconducting state, it is possible to start and drive the superconducting rotating machine 100.

Sixth Modification

A superconducting rotating machine 100 can be configured such that an inner rotor 20 and an outer rotor 30 each have at least a superconducting squirrel cage winding (a) as a rotor winding, and a critical current (A1) for bringing a superconducting squirrel cage winding 22A of the inner rotor 20 into a magnetic flux flow state, and a critical current (A2) for bringing a superconducting squirrel cage winding 32A of the outer rotor 30 into a magnetic flux flow state are different. According to the configuration, it becomes possible to realize a magnetic flux flow state in one of the rotors in a lower critical current than in the other rotor, so that timings for capturing linkage magnetic flux in the two rotors can be made different. Thereby, it is possible to switch a plurality of modes in which both the rotors perform slip rotation, one of the rotors performs slip rotation whereas the other rotor performs synchronous rotation, and both the rotors perform synchronous rotation according to a surrounding environment, and a situation of a remaining energy amount, energy efficiency or the like.

Seventh Modification

A superconducting rotating machine 100 can be configured such that an inner rotor 20 and an outer rotor 30 each have at least a superconducting squirrel cage winding (a) as a rotor winding, and configured to include a switching mechanism that can switch between bringing only either one of a superconducting squirrel cage winding 22A of the inner rotor 20 and a superconducting squirrel cage winding 32A of the outer rotor 30 into a magnetic flux flow state and bringing the superconducting cage windings of both the rotors into a magnetic flux flow state. By including the switching mechanism, it is possible to cause magnetic flux to link to only the rotor with a low critical current and keep the other rotor with a high critical current shielded from magnetic flux, at a time of light load. In order to suppress joule loss and drive the superconducting rotating machine 100 with high efficiency, the superconducting rotating machine 100 outputs (drives) with moderate load by only one of the rotors first at the time of light load, and thereby it becomes possible to drive the superconducting rotating machine 100 with high efficiency even at low output. On the other hand, at a time of high load, highly efficient operation is possible by linking magnetic flux to both the two rotors and having them bear the output. In other words, it is possible to drive the superconducting rotating machine 100 with high efficiency at both the time of light load and the time of high load, by configuring the superconducting rotating machine 100 such that only one of the rotors can be brought into a magnetic flux flow state at the time of light load, and both the rotors can be brought into the magnetic flux flow state at the time of high load by the switching mechanism.

Means of the aforementioned "switching mechanism" may be a physical switch or switching by control means, and is not limited, but by configuring the superconducting squirrel cage winding 22A of the inner rotor 20 and the superconducting squirrel cage winding 32A of the outer rotor 30 so that the critical currents for bringing the two rotors into a magnetic flux flow state are different from each other, for example, it is possible to switch the mode of making it possible to bring only the superconducting squirrel cage winding (a) of either one of the inner rotor and the outer rotor into a magnetic flux flow state and a mode of making it possible to bring both the rotors into a magnetic flux flow state autonomously according to the load (rotation speed) without providing a physical switch or the like. In other words, a difference between the critical currents for bringing the two rotors into a magnetic flux flow state is the aforementioned "switching mechanism". This makes it unnecessary to worry about upsizing of the system, an influence by heat generation from a physical switch and the like following installation of the physical switch, and it is possible to reduce a system burden due to switching control by additional control means.

A principle of autonomous switching between the mode that makes it possible to bring only the superconducting squirrel cage winding of either one of the inner rotor 20 and the outer rotor 30 into a magnetic flux flow state, and the mode that makes it possible to bring both the rotors into a magnetic flux flow state according to the load (rotation speed) by making the critical currents of the superconducting squirrel cage winding 22A of the inner rotor 20 and the superconducting squirrel cage winding 32A of the outer rotor 30 different is described. Let the critical current of the superconducting squirrel cage winding 22A of the inner rotor 20 be "Irc1", the critical current of the superconducting squirrel cage winding 32A of the outer rotor 30 be "Irc2", and "Irc1<Irc2" be established, for example. However, in the present embodiment, a relationship of Irc1 and Irc2 is not limited to this.

First, when a voltage is applied to a stator winding at a primary side to pass a primary current Is as "Is1", if a current Ir1 flowing through the superconducting squirrel cage winding 22A of the inner rotor 20 and a current Ir2 flowing through the superconducting squirrel cage winding 32A of the outer rotor 30 following the primary current satisfy conditions "Ir1<Irc1" and "Ir2<Irc2" respectively, that is, if Ir1 and Ir2n are respectively smaller than the critical currents Irc1 and Irc2, the magnetic flux produced by the stator winding does not link, and the rotors do not start.

Next, the stator current is increased, and when the stator current reaches Is=Is2 (Is2>Is1), if Ir1>Irc1, and Ir2<Irc2 are established (in other words, Ir1 becomes larger than the critical current Irc1), the magnetic flux produced by the stator winding links to only the superconducting squirrel cage winding 22A of the inner rotor 20, and the inner rotor 20 starts. When the inner rotor 20 and the outer rotor are fixed to a same shaft as described in FIG. 2, the inner rotor 20 and the outer rotor start at the same time. At this time, if a winding ratio of the stator winding and the superconducting squirrel cage winding 22A of the inner rotor 20 is n1 (>1), and a winding ratio of the stator winding and the superconducting squirrel cage winding 32A of the outer rotor 30 is n2 (>1), Is2 can be regarded as a current that is approximately a sum of "Ir1/n1" and "Ir2/n2", though it is not a precise value. Ir2 settles on a current value that balances the load, when the rotor reaches a synchronous rotation speed after starting. When the current value of the superconducting squirrel cage winding 22A of the inner rotor 20 is Ir1, st(<Irc1), and the current value of the superconducting squirrel cage winding 32A of the outer rotor 30 is Ir2, st(<Irc2) at the time when the current value settles on the current value that balances the load, Irc1<Irc2 is established, so that Is at this time is only Ir1, st/n1, that is, only Ir1, st/n1 flows through only the superconducting squirrel cage winding 22A of the inner rotor 20, Is is small, and joule loss generated in the winding is also small. In other words, for example, when the critical currents of the superconducting squirrel cage winding 32A of the outer rotor 30 and the superconducting squirrel cage winding 22A of the inner rotor 20 are the same (in the case of Irc1=Irc2), Is can roughly be regarded as "Ir1, st/n1"+"Ir1, st/n2" although strictly speaking, it is assumed that winding impedances of both are different even when the critical currents of both are the same because dimensions of the windings are different at the inner side and the outer side in the radial direction. In this case, Is increases, and joule loss increases. Therefore, it is possible to reduce the joule loss, by linking magnetic flux to only one of the rotors (in the above-described case, the inner rotor 20) (by only the inner rotor 20 bearing the output in the above-described case) at the time of light load.

When the load increases, Ir1, st increases, and when Ir1, st>Irc1 is established, magnetic flux from the rotor links to the inner rotor 20 to shift the inner rotor 20 to slip rotation. At this time, if Ir2, st>Irc2 is satisfied immediately at a timing at which the inner rotor 20 shifts to slip rotation, the superconducting squirrel cage winding 32A of the outer rotor 30 captures magnetic flux and can shift to synchronous rotation. On the other hand, when Ir2, st>Irc2 is not immediately satisfied, the load further increases to establish Ir1, st>Irc2, magnetic flux from the stator links to the outer rotor 30, thereafter, when the outer rotor 30 shifts to slip rotation, the superconducting squirrel cage winding 32A of the outer rotor 30 captures magnetic flux to shift to synchronous rotation, and both the outer rotor 30 and the inner rotor 20 bear the output.

From the above, at the light load, magnetic flux is captured by only the rotor winding of the superconducting squirrel cage winding 22A of the inner rotor 20 and output is produced, whereby loss can be decreased more than when magnetic flux links to both the rotor windings to produce output.

Eighth Modification

Figure 9:
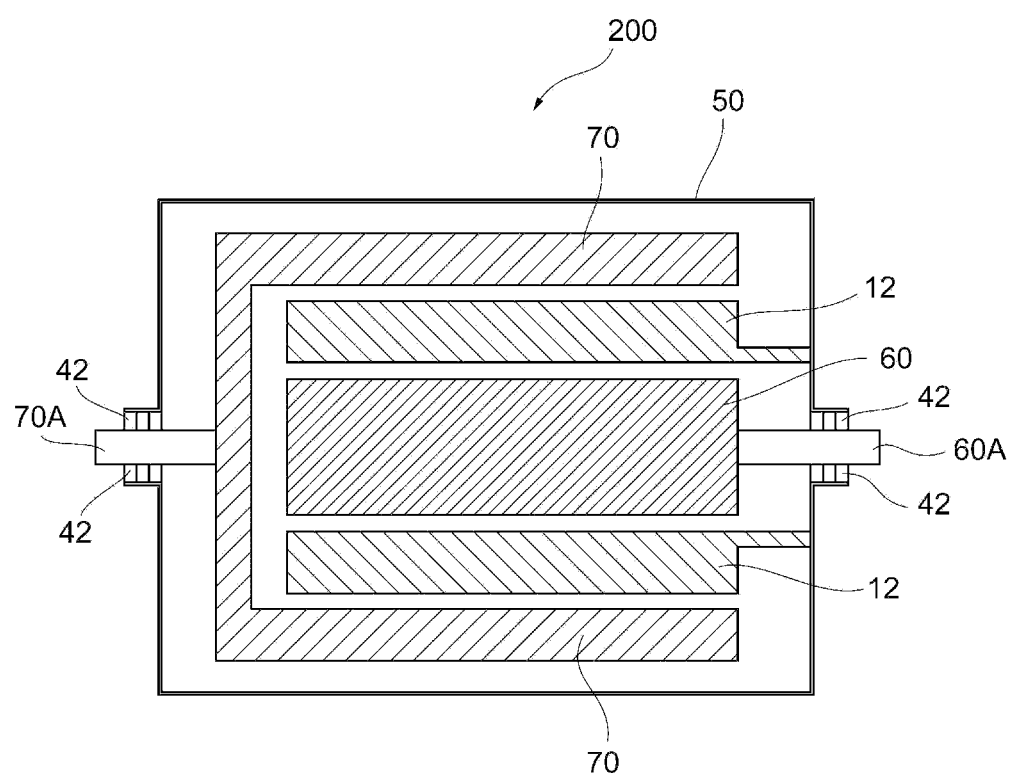
FIG. 9 is an explanatory view showing a section in an axial direction of another example of the superconducting rotating machine.

As the superconducting rotating machine 100, the mode in which the inner rotor 20 and the outer rotor 30 are fixed to the same shaft, and output (torque) is exhibited by the one rotating shaft is described, but the present invention is not limited to the mode. For example, in the superconducting rotating machine 100, the inner rotor 20 and the outer rotor 30 are integrally configured, but the inner rotor and the outer rotor may be configured to rotate independently. FIG. 9 is an explanatory view showing a section in an axial direction of another example of the superconducting rotating machine. Note that in FIG. 9, for the same members as in FIG. 2, the same reference signs are shown, and explanation thereof is omitted.

As shown in FIG. 9, a superconducting rotating machine 200 includes a toroidal stator 12, an inner rotor 60 and an outer rotor 70. A rotating shaft 60A is connected to one end portion of the inner rotor 60. A rotating shaft 70A is connected to one end portion of the outer rotor 70, and the inner rotor 60 and the outer rotor 70 are configured to be independently rotatable.

According to the configuration, it is possible to realize a configuration in which a rotation speed (RS1) of the inner rotor, and a rotation speed (RS2) of the outer rotor are different, for example. According to the configuration, it is possible to realize a configuration in which in a state where a rotor of either one of the inner rotor and the outer rotor is stopped, the other rotor is rotatable.

According to the configuration, it is possible to perform switching of the rotation speeds of both the rotors, and rotation/stop, and the like, according to the surrounding environment and the situation of energy remaining amount, energy efficiency or the like as in the sixth modification described above.

Other Modifications

For example, the aforementioned superconducting wire rod is not limited to a bismuth high-temperature superconducting wire rod, and can be a metal low-temperature superconducting wire rod represented by NbTi or $Nb_3Sn$, an yttrium high-temperature superconducting wire rod, or a magnesium diboride superconducting wire rod.

In the present embodiment described above, the case of using the wire rods as the superconducting material and the normal conducting material is described, but the present invention is not limited to the mode, and, for example, a bulk material may be used as the superconducting material and the normal conducting material. For example, bulk materials can be used as the superconducting material and/or the normal conducting material according to applications in which it is desired to use materials with a large current capacity in the stator and the rotor (for example, a large superconducting motor or the like).

In the embodiment described above, the superconducting squirrel cage windings 22A and 32A and the normal conducting squirrel cage windings 22B and 32B are separate bodies, but they may be integrally configured. In other words, the highly conductive metal in the superconducting wire rods of the superconducting squirrel cage windings 22A and 32A may be made to have a predetermined thickness or more, and the highly conductive metal portions may be used as the normal conducting squirrel cage windings 22B and 32B.

In the embodiment described above, in the inner rotor 20, the normal conducting squirrel cage winding 22B is disposed at the outer side in the inner rotor 20, and the superconducting squirrel cage winding 22A is disposed at the inner side thereof, but the superconducting squirrel cage winding 22A may be disposed at the outer side. When the normal conducting squirrel cage winding 22B is placed at the outer side, the induction (slip) torque in the normal conducting state and the induction (slip) torque in the superconducting state can be increased, and when the superconducting squirrel cage winding 22A is disposed at the outer side, the synchronous torque in the superconducting state can be increased. Likewise, arrangement of the superconducting squirrel cage winding 32A and the normal conducting squirrel cage winding 32B in the outer rotor 30 may be changed.

In the embodiment described above, the superconducting squirrel cage windings 22A and 32A and the normal conducting squirrel cage windings 22B and 32B are accommodated one by one in the slots 34S, but the present invention is not limited to this. For example, slots for accommodating the superconducting squirrel cage windings 22A and 32A, and slots for accommodating the normal conducting squirrel cage windings 22B and 32B may be separately provided. In this case, the number of rotor bars 26A of the superconducting squirrel cage windings 22A and 32A, and the number of rotor bars 26B of the normal conducting squirrel cage windings 22B and 32B may not be the same. A configuration in which some of the rotor bars 26A and 26B are accommodated in the same slots, and remaining rotor bars are accommodated in different slots may be adopted.

Various embodiments of the present embodiment are described above, but the present embodiment is not limited to the embodiments described above. The present embodiment can be modified without departing from the gist thereof.

The disclosure of Japanese Patent Application No. 2020-056792, filed on Mar. 26, 2020, is incorporated in the present description by reference in its entirety.

All literatures, patent applications, and technical standards mentioned in the description are incorporated in the present description by reference to the same extent as when it is specifically and individually noted that each individual literature, patent application, and technical standard are incorporated herein by reference.

REFERENCE SIGNS LIST

12: toroidal stator, 14: stator iron core, 16: stator winding, 20, 60: inner rotor, 22A, 32A: superconducting squirrel cage winding, 22B, 32B: normal conducting squirrel cage winding, 24S, 34S: slot, 26A, 26B, 36A, 36B: rotor bar, 28A, 28B, 38A, 38B: end ring, 30, 70: outer rotor, 100, 200: superconducting rotating machine

The invention claimed is:

1. A superconducting rotating machine, comprising:
a stator that includes a cylindrical stator iron core and a stator winding that is toroidally wound around the stator iron core and formed of a superconducting material, and generates a rotating magnetic field at an inner circumferential side and an outer circumferential side of the stator;
an inner rotor rotatably held at the inner circumferential side of the stator; and
an outer rotor rotatably held at the outer circumferential side of the stator,
wherein the inner rotor and the outer rotor each include:
at least one rotor winding selected from a superconducting squirrel cage winding including a single or a plurality of rotor bars and end rings that are formed of a superconducting material, and a normal conducting squirrel cage winding including a single or a plurality of rotor bars and end rings that are formed of a normal conducting material, and
a rotor iron core including a plurality of slots that accommodate the respective rotor bars of the rotor winding.

2. The superconducting rotating machine according to claim 1, wherein at least one of the inner rotor and the outer rotor includes at least the superconducting squirrel cage winding as the rotor winding.

3. The superconducting rotating machine according to claim 1, wherein at least one of the inner rotor and the outer rotor includes the superconducting squirrel cage winding and the normal conducting squirrel cage winding as the rotor winding.

4. The superconducting rotating machine according to claim 1, wherein the inner rotor and the outer rotor each include at least the superconducting squirrel cage winding as the rotor winding.

5. The superconducting rotating machine according to claim 3, wherein the inner rotor and the outer rotor each include at least the superconducting squirrel cage winding as the rotor winding, and a critical current for bringing the superconducting squirrel cage winding of the inner rotor into a magnetic flux flow state and a critical current for bringing the superconducting squirrel cage winding of the outer rotor into a magnetic flux flow state are different.

6. The superconducting rotating machine according to claim 1, wherein the inner rotor and the outer rotor each include at least the superconducting squirrel cage winding as the rotor winding, and only the superconducting squirrel cage winding of either one of the inner rotor and the outer rotor can be switched to a magnetic flux flow state.

7. The superconducting rotating machine according to claim 6, wherein a critical current for bringing the superconducting squirrel cage winding of the inner rotor into a magnetic flux flow state and a critical current for bringing the superconducting squirrel cage winding of the outer rotor into a magnetic flux flow state are different, and only the superconducting squirrel cage winding of either one of the inner rotor and the outer rotor can be switched to a magnetic flux flow state according to a difference between the critical current for bringing the superconducting squirrel cage winding of the inner rotor into a magnetic flux flow state and the critical current for bringing the superconducting squirrel cage winding of the outer rotor into a magnetic flux flow state.

8. The superconducting rotating machine according to claim 4, wherein the inner rotor and the outer rotor each include at least the superconducting squirrel cage winding as the rotor winding, and a critical current for bringing the superconducting squirrel cage winding of the inner rotor into a magnetic flux flow state and a critical current for bringing the superconducting squirrel cage winding of the outer rotor into a magnetic flux flow state are different.

* * * * *